US012526956B2

(12) United States Patent
Tan et al.

(10) Patent No.: US 12,526,956 B2
(45) Date of Patent: Jan. 13, 2026

(54) HOSE MANAGEMENT SYSTEM FOR SERVER LIQUID COOLING

(71) Applicant: Nvidia Corporation, Santa Clara, CA (US)

(72) Inventors: Chong S. Tan, The Woodlands, TX (US); Jiaheng Zhang, Santa Clara, CA (US); Jason Yu Chih Su, San Jose, CA (US); Helen Hueijung Liu, Los Angeles, CA (US)

(73) Assignee: Nvidia Corporation, Santa Clara, CA (US)

( * ) Notice: Subject to any disclaimer, the term of this patent is extended or adjusted under 35 U.S.C. 154(b) by 351 days.

(21) Appl. No.: 18/233,748

(22) Filed: Aug. 14, 2023

(65) Prior Publication Data

US 2025/0063687 A1 Feb. 20, 2025

(51) Int. Cl.
*H05K 7/20* (2006.01)
*F16L 55/00* (2006.01)

(52) U.S. Cl.
CPC .......... *H05K 7/20272* (2013.01); *F16L 55/00* (2013.01); *H05K 7/20772* (2013.01)

(58) Field of Classification Search
None
See application file for complete search history.

(56) References Cited

U.S. PATENT DOCUMENTS

| | | | | |
|---|---|---|---|---|
| 6,674,643 | B2 * | 1/2004 | Centola | H05K 7/20672 361/720 |
| 7,187,552 | B1 * | 3/2007 | Stewart | G06F 1/185 257/E23.102 |
| 7,641,101 | B2 * | 1/2010 | Campbell | H05K 7/20772 228/183 |
| 2006/0139891 | A1 * | 6/2006 | Gauche | H01L 23/427 257/E23.088 |
| 2007/0201210 | A1 * | 8/2007 | Chow | H05K 7/20727 361/695 |
| 2009/0080151 | A1 * | 3/2009 | Kalms | G06F 1/20 361/679.52 |
| 2013/0188316 | A1 * | 7/2013 | Eagle | G06F 1/20 361/702 |
| 2021/0195805 | A1 * | 6/2021 | Ochiai | H01L 23/473 |

* cited by examiner

*Primary Examiner* — Courtney L Smith
(74) *Attorney, Agent, or Firm* — Hogan Lovells US LLP

(57) ABSTRACT

Systems and methods herein are for hose management in a computing module. A rotatable support structure includes a moveable inset structure and is to support rotation movement of cooling hoses that are to cool underlying devices in the computing module, where the rotation movement is about an axis of the computing module to allow the cooling hoses to be moved away from the underlying devices of the computing module and where the movable inset structure is movable within the rotatable support structure to receive tension on the cooling hoses from being coupled to a manifold of the computing module.

20 Claims, 8 Drawing Sheets

HOSE MANAGEMENT SYSTEM FOR SERVER LIQUID COOLING

TECHNICAL FIELD

At least one embodiment pertains to hose management in a computing module. For example, a rotatable supporting structure and a moveable inset structure support cooling hoses to allow them to be moved away from underlying devices without damaging the cooling hoses.

BACKGROUND

A computing module or server may include liquid cooling that requires cooling hoses associated with a liquid manifold (also referred to herein as a manifold) to bring cooling liquid into the computing module. The cooling hoses may be associated with one or more cooling or cold plates that are associated with liquid manifold on one side and with a computing device that generates heat during operation on another side. The cooling plates are coupled to the manifold with different cooling hoses that may be distinct from the cooling hoses associated between the cooling manifold and an external cooling system or a different manifold that belongs to a server or a rack, for instance. However, one or more of such cooling hoses may have different lengths. To access areas within a computing module, the cooling hoses may need to be removed. With the different lengths, the cooling hoses may be subject to different relative movement if they are fixed within the computing module. Due to limited space within a computing module, any fixed structure may be disrupted in movement by at least the different rotating axes. Further, the cooling hoses can shift during shipping and handling, and can damage other components in the computing module. While clips or clamps may be used to secure long hoses to the computing module, these approaches interfere with servicing needs.

DETAILED DESCRIPTION

Figure 1:
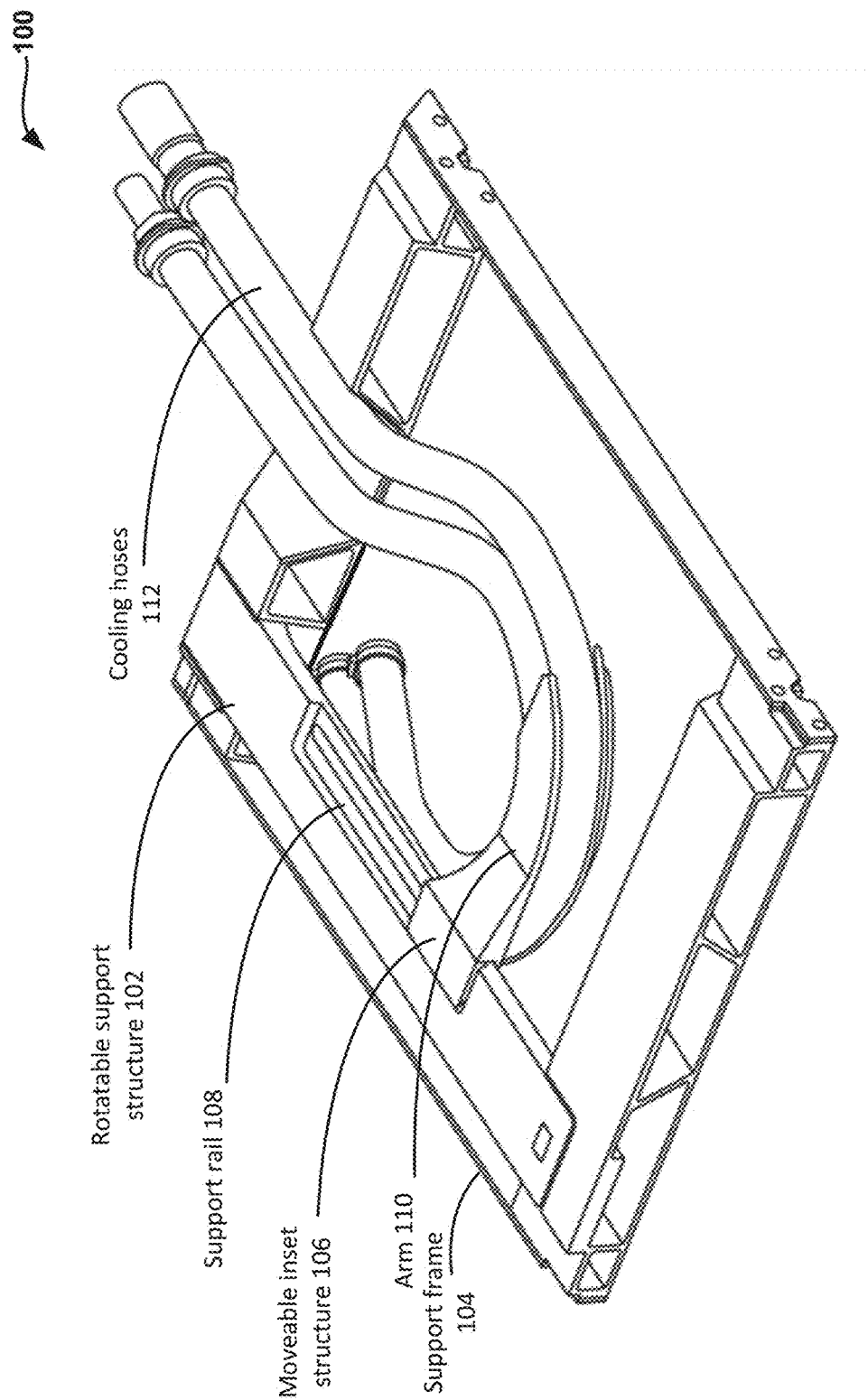
FIG. 1 illustrates a system that is subject to embodiments of hose management in a computing module.

FIG. 1 illustrates a system 100 that is subject to embodiments of hose management in a computing module, as detailed herein. The system 100 includes a rotatable support structure 102 coupled to or mounted on a support frame 104. In at least one embodiment, however, the rotatable support structure 102 is mounted directly within a computing module. The rotatable support structure 102 includes or is associated with a moveable inset structure 106 that may be distinct from or integrated with an arm 110. The rotatable support structure 102 can support rotation movement of cooling hoses 112 that are to cool underlying devices in the computing module.

In at least one embodiment, system 100 for hose management herein allows the rotatable support structure 102 to swing in a rotation movement and allows the moveable inset structure 106 to slide in a linear movement that together improve accessibility within the computing module for ease of servicing and maintenance. In normal use, the rotatable support structure 102 may be latched in the closed stage or in a "down" position. Further, a contoured or arc-shaped arm or clamp 110 may include a plastic material that can be associated to the moveable inset structure 106 on one side, and to the cooling hoses 112 on another side. This arm 110 holds the cooling hoses in place in one or more positions, including in the closed position, an open position, and an intermediate position.

When service is needed, the rotatable support structure 102 may be lifted, which causes the moveable inset structure 106 to slide in a linear movement through a slider or support rail 108. This allows the cooling hoses to be easily rotated out of the way without needing to undo the arm 110 that remains associated with the cooling hoses. Further, the moveable inset structure 106 slides because of a tension on the cooling hoses from being associated with at least a liquid manifold within the computing module. The shape of the arm 110 allows the cooling hoses 112 to keep its natural curved shape and prevents excessive force from being applied to couplers or other aspect of the manifold, during rotation.

In at least one embodiment, the rotatable support structure 102 and the moveable inset structure 106 are moveable relative to each other to support the cooling hoses 112. Such relative movement allows the cooling hoses 112 to be moved away from underlying devices of the computing module to access the underlying devices without damaging the cooling hoses. Further, a rotatable coupler or a rotational aspect of a manifold, as described further with respect to one or more of the figures herein, may be associated with a proximal end of the cooling hoses 112. This is so that the rotational movement of the cooling hoses also allow the rotatable couplers or the aspect to rotate about the axis of the computing module.

Further, the arm 110 is integrated or removably associated with the moveable inset structure 106. The arm may be of a metal material that extends from the moveable inset structure 106 and that includes a hose support of a plastic material to allow some movement there through of the cooling hoses 112, without damage that may be otherwise caused by friction. Such damage may otherwise occur as the cooling hoses 112 may be under tension during the rotation movement because a proximal end of the cooling hoses 112 remains attached to a manifold within the computing module. Still further, the arm 110 may be shaped in an arc to support a loop position of the cooling hoses 112 as the cooling hoses 112 are routed in a manner causing an extension in a first direction, into the computing module, and then a back-track that is counter to the first direction, to the manifold.

In at least one embodiment, such a system 100 for hose management can address an aforementioned problem of cooling hoses being of different lengths and that may be subject to movement during shipping and handling or that may be subject to maintenance, where the movement can damage the cooling hoses and one or more other components of the computing module. Further, such a system 100 for hose management can also address hose layouts that may be unwieldy within a computing module. Such unwieldly layouts may make servicing and maintenance challenging for a computing module, as a user may need to hold the cooling hoses out of the way to access underlying devices and spaces. The system 100 for hose management uses one or more structures, including the rotatable support structure 102, the support frame 104, and the moveable inset structure 106, that are movable relative to each other, angularly or linearly, but that also support cooling hoses of different sizes to enable installation and servicing of a computing module.

Figure 2:
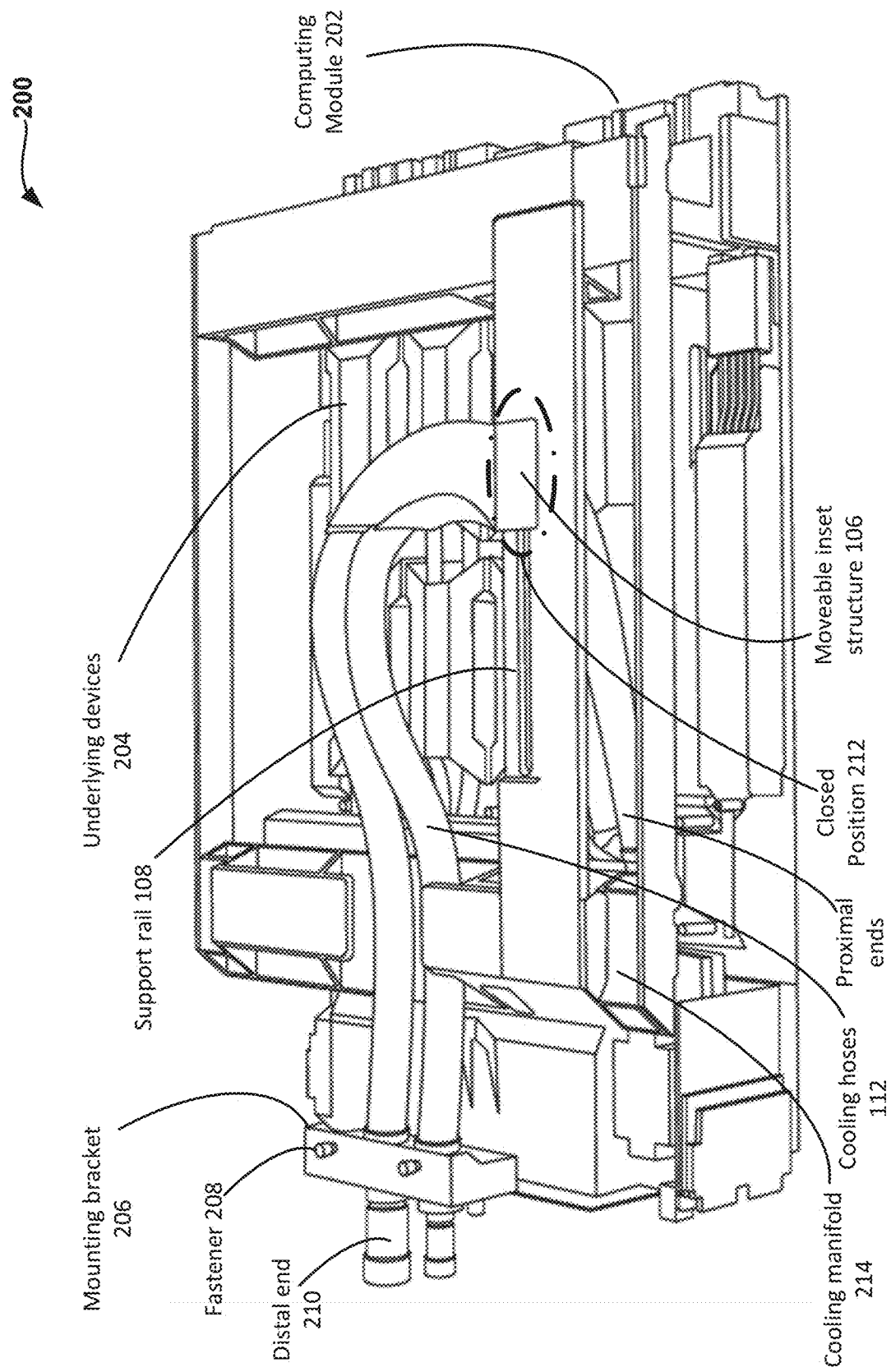
FIG. 2 illustrates a closed stage of a system associated with hose management in a computing module, according to at least one embodiment.

FIG. 2 illustrates a closed stage 200 of a system associated with hose management in a computing module, according to at least one embodiment. As illustrated, in the closed stage 200, the cooling hoses 112 are lowered, close to the computing module 202. The computing module 202 includes underlying devices 204 that are subject to cooling using liquid in the cooling hoses 112. For example, the underlying devices may be graphics processing units (GPUs), central processing unit (CPUs), data processing units (DPUs), memory devices, or other devices that generate heat during computing operations and that benefit from liquid cooling.

In at least one embodiment, the underlying devices are coupled to cooling plates or cold plates. The cold plates are coupled to at least one cooling manifold 214. The manifold receives cooling liquid from at least one of the cooling hoses 112 and discharges heated or spent cooling liquid using at least one other of the cooling hoses 112. There may be separate manifolds for the cooling liquid and for the heated or spent cooling liquid. In at least one embodiment, the cooling manifold 214 may include a rotational aspect to be associated with the cooling hoses. The rotational aspect of the manifold can also rotate about an axis of the computing module to support the rotation movement of the cooling hoses. For example, the manifold may be hinged at its ends or may be within a section of a wall of the computing module 202, which form part of a rotational aspect, to allow the cooling manifold 214 to rotate.

In FIG. 2, the cooling hoses 112 are associated with a mounting bracket 206 at a distal end 210. In the closed stage, the mounting bracket 206 is removably associated with the computing module 202 and can be removed to enable the rotatable support structure 102 to be: rotated about an axis of the computing module 202. In at least one embodiment, the mounting bracket 206 is removably associated with the computing module 202 using fasteners 208, including screws, magnets, latches, or other removable latching systems. In the closed position, the underlying devices 204 are inaccessible as the cooling hoses 112 are at least over the underlying devices 204. The cooling hoses 112 may be fully or partly over the underlying devices.

Figure 3:
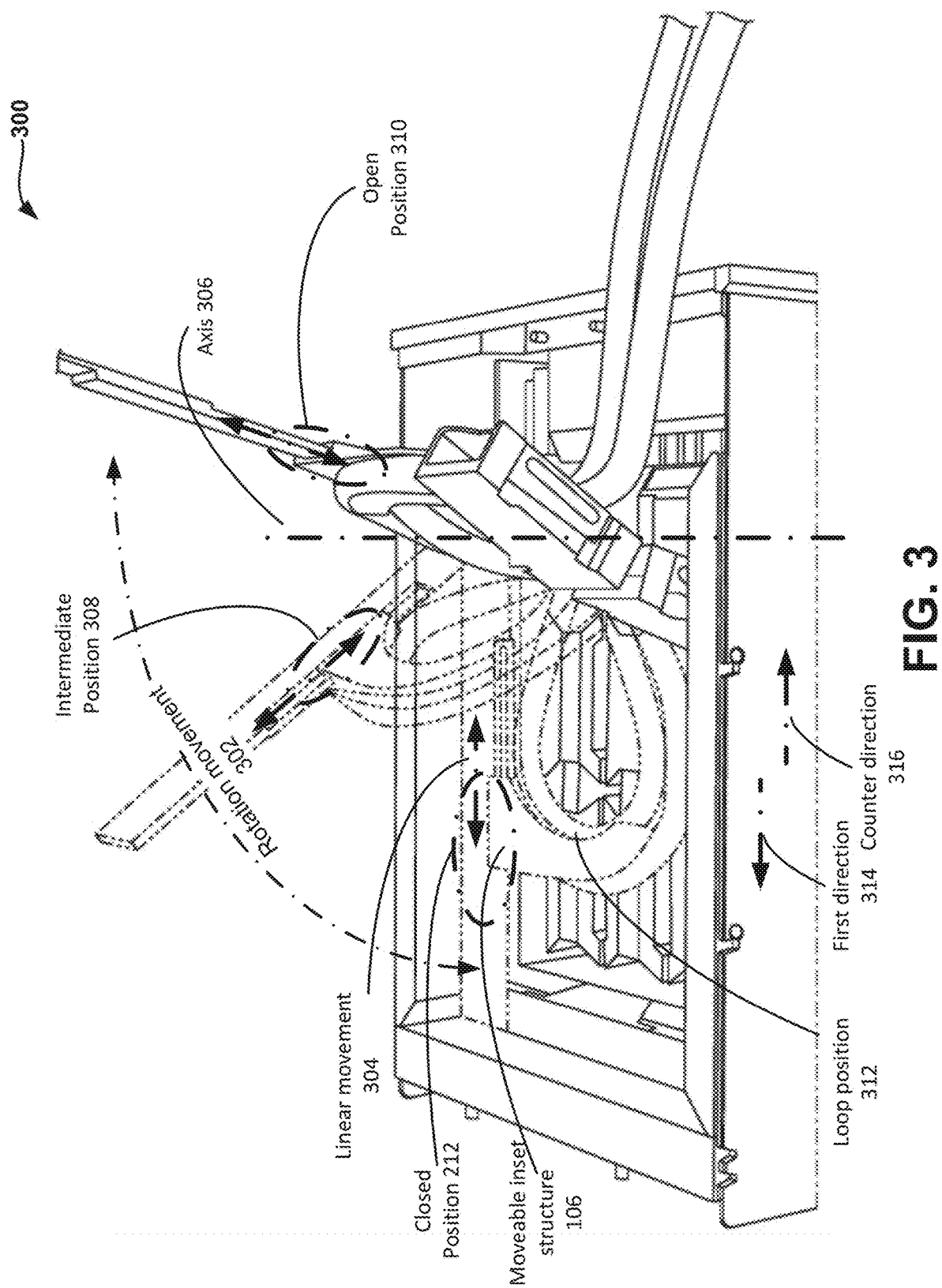
FIG. 3 illustrates stages of a system associated with hose management in a computing module, according to at least one embodiment.

FIG. 3 illustrates stages 300 of a system associated with hose management in a computing module, according to at least one embodiment. In at least one embodiment, the rotatable support structure 102 can be moved to any number of positions between the closed position, as described with respect to FIG. 2, and an open position 310. For example, when the rotatable support structure 102 is lifted, a rotation movement 302 is endured by the cooling hoses. The rotation movement 302 may be about an axis 306 that is across the computing module. The rotation movement 302 allows the cooling hoses 112 to be moved away from the underlying devices 204 of the computing module, as illustrated in FIG. 3 versus the closed position 212, as illustrated in FIG. 2.

In at least one embodiment, an intermediate position 308 may be enabled by allowing the rotatable support structure 102 to be locked in place, in its position after some rotation movement 302 has been applied. For example, a spring-loaded ratchet, wheel, or pin may be used with the rotatable support structure 102, such as to extend from the rotatable support structure 102 and to engage a fixed feature of the computing module 202. This allows different intermediate positions 308 to be maintained for the moveable inset structure 106 about the axis 306 of the computing module. For example, to access certain parts of the computing module, an intermediate position 308 may be sufficient or if the computing module 202 is within a rack, there may be limited space above the computing module 202 to allow the movable inset structure 106 to be in the open position 310.

FIG. 3 also illustrates that the movable inset structure 106 is subject to linear movement 304 within the rotatable support structure 102, such as via the support rail 108. The linear movement 304 allows the movable inset structure 106 to receive tension on the cooling hoses 112. As the cooling hoses 112 are coupled to a cooling manifold 214 of the computing module 202, a tension may be applied on the cooling hoses 112 from this coupling as the rotatable support structure 102 is lifted. This tension may be higher if at least one of the cooling hoses 112 is short. A result of the tension is that the movable inset structure 106 moves towards the cooling manifold 214 or is pulled towards the manifold by a stiffness of the cooling hoses 112. However, when the rotatable support structure 102 is rotated back, by the rotation movement 302, to a closed position, the movable inset structure 106 is also pushed back to its closed position 212 because of the same stiffness of the cooling hoses 112.

FIG. 3 also illustrates that the arm 110 is shaped in an arc to support a loop position 312 of the cooling hoses 112. The loop position 312 may be formed from a stiffness in the cooling hoses 112, when the cooling hoses 112 are within the arm 110 and are in a first direction 314 into the computing module 202 and extend counter direction 316 to the first direction, to the cooling manifold 214. In at least one embodiment, therefore, a rotatable support structure 102 supports rotation movement 302 of cooling hoses 112 that are to cool underlying devices 204 in a computing module 202. The includes a moveable inset structure 106. The rotation movement 302 is about an axis 306 of the computing module 202 to allow the cooling hoses 112 to be moved away from the underlying devices 204 of the computing module 202. For example, the cooling hoses 112 are moved from a closed position 212 or other intermediate position 308 by virtue of being associated with the movable inset structure 106 that is moved. The cooling hoses 112 are moved away by virtue of being associated with the movable inset structure 106 that is moved to the open position 310. Further, the movable inset structure 106 is movable with respect to the rotatable support structure 102 to receive the tension on the cooling hoses 112 from being coupled to a manifold of the computing module 202.

Figure 4:
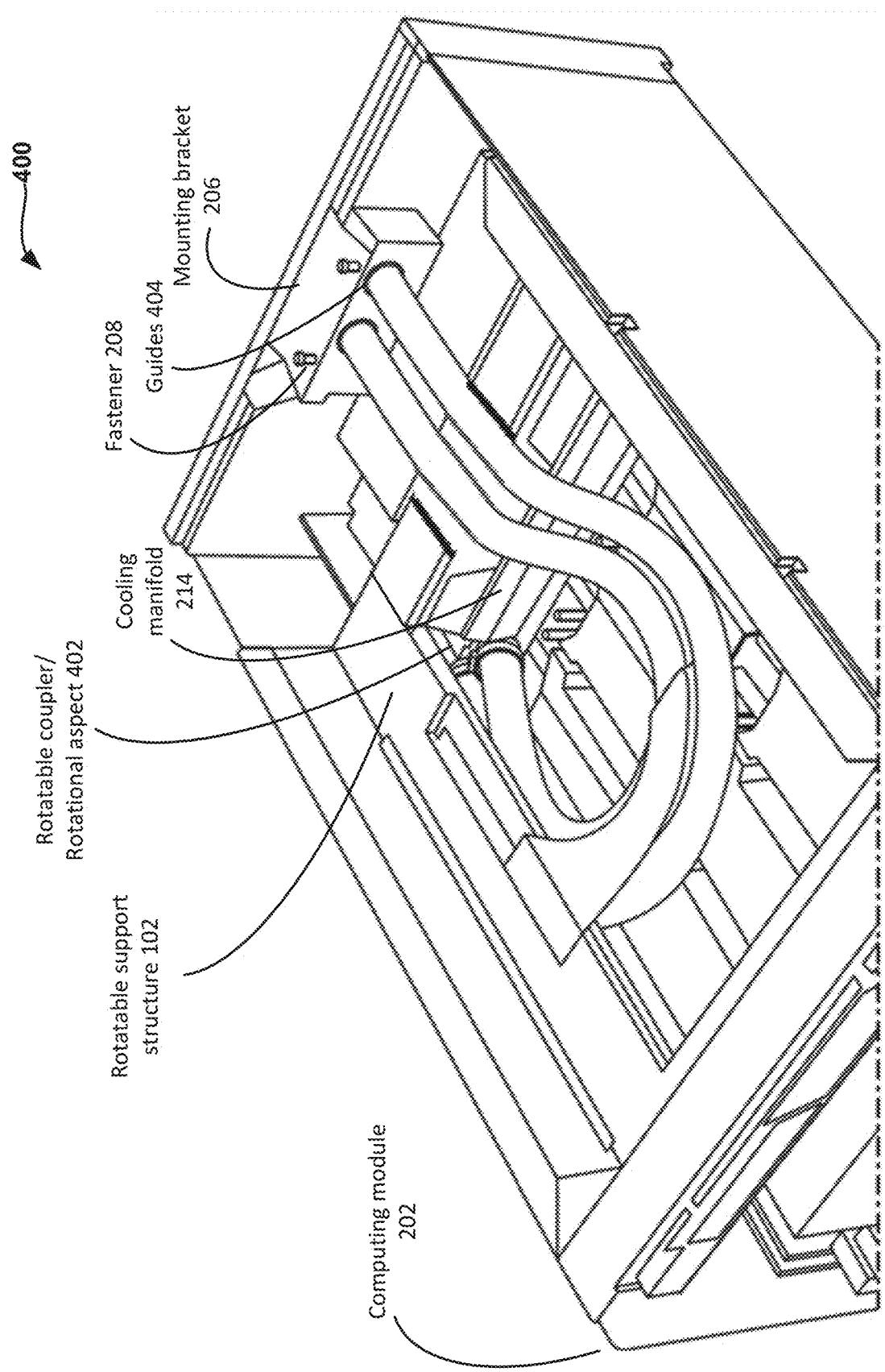
FIG. 4 illustrates further aspects of a system associated with hose management in a computing module, according to at least one embodiment.

FIG. 4 illustrates further aspects 400 of a system associated with hose management in a computing module, according to at least one embodiment. The aspects 400 include a rotatable coupler or a rotational aspect 402 of the cooling manifold 214 that is associated with the cooling hoses 112, such as at proximal ends 216 of the cooling hoses 112. The rotatable coupler or the rotational aspect 402 of the cooling manifold 214 can also rotate about the axis 306 of the computing module 202 to support the rotation movement 302 of the cooling hoses 112. The aspects 400 also include the mounting bracket 206 that supports distal ends 210 of the cooling hoses against the computing module 202. The mounting bracket 206 is removably associated with the computing module 202 or with the support frame 104 via fasteners 208. To move the cooling hoses 112 away from its closed position, the fasteners 208 may be undone to let the distal ends 210 of the cooling hoses 112 move freely in any spatial direction prior to the rotatable support structure 102 being lifted from the support frame 104.

In at least one embodiment, FIG. 4 also illustrates aspects 400 of the mounting bracket 206 being a handle that may be lifted and rotated to release cooling hoses 112 without a need to remain associated with the cooling hoses 112. In at least one embodiment, guides 404 may be provided in the mounting bracket 206 with clips on an outside of the distal ends 210 of the cooling hoses 112. This ensures that the mounting bracket 206 remains associated with the cooling hoses 112 once the cooling hoses 112 are undone from the computing module 202 or the support frame 104. In at least one embodiment, one or more of the materials in contact with the cooling hoses 112 may be a plastic material, such as polyurethane or thermoplastic polyurethane.

In at least one embodiment, hose management using, in part, such aspects 400 described in FIG. 4 eliminates a need for having multiple parties to service the computing modules because the rotatable support structure 102 and the movable inset structure 106 allow lifting of the cooling hoses 112 and allow the cooling hoses 112 to be locked in the open or "up" position 310 to expose the underlying devices 204. The mounting bracket 206 and the movable inset structure 106 act as a flexible or movable clamps by allowing the cooling hoses 112 to be released on the distal ends 210 and to slide closer to the proximal ends 216. Therefore, the hose management of at least the aspects 400 herein provide automatic adjustments to clamp positions to prevent excess force or tension on the cooling hoses 112 during movement to service the underlying devices 204.

Figure 5:
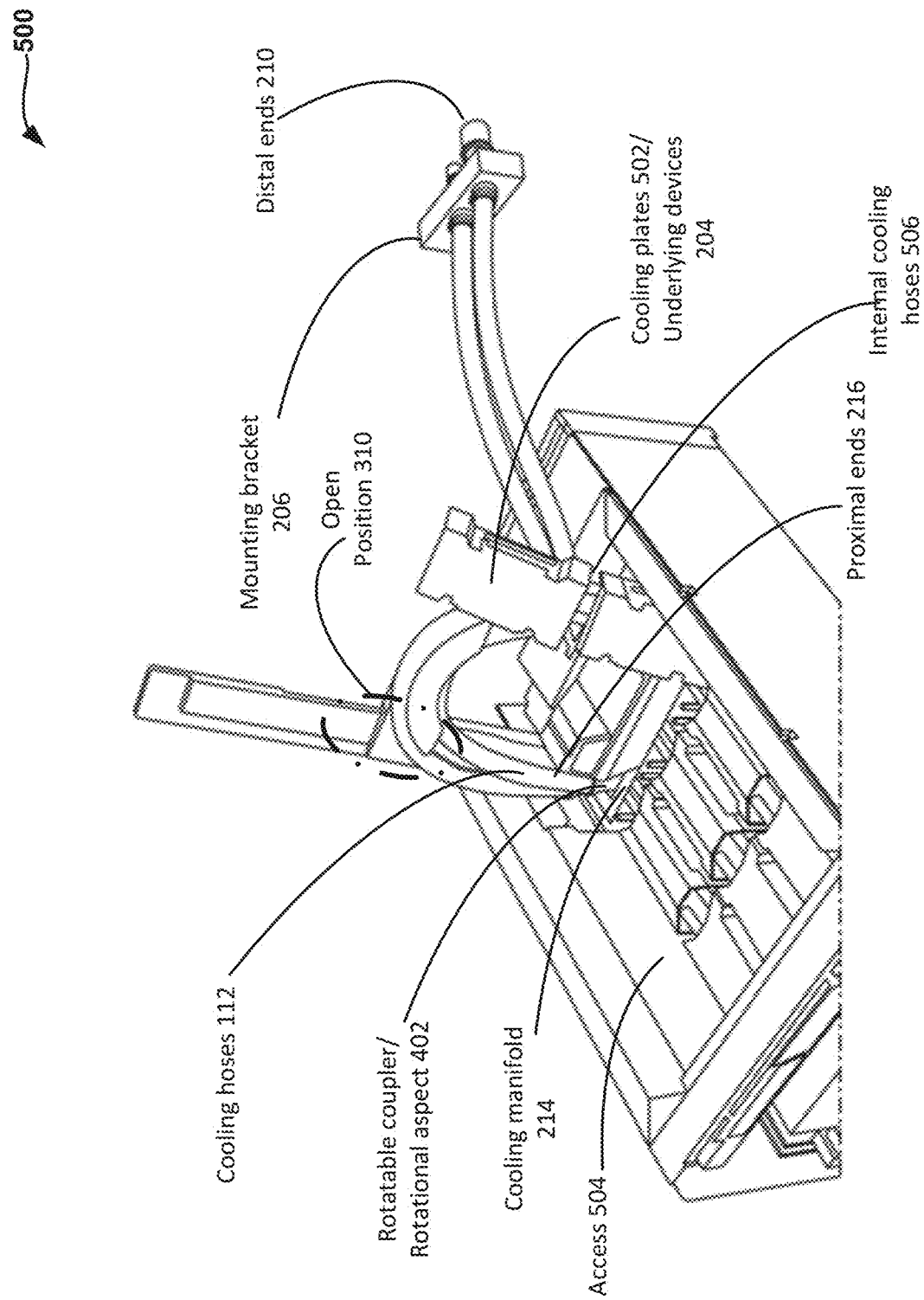
FIG. 5 illustrates an open stage of a system associated with hose management in a computing module, according to at least one embodiment.

FIG. 5 illustrates an open stage 500 of a system associated with hose management in a computing module, according to at least one embodiment. In the open stage 500, the access 504 to the underlying devices 204, including to the cooling or cold plates 502 is possible as illustrated. For example, the cooling or cold plates 502 may be associated with distinct cooling hoses than the cooling hoses 112 of the rotatable support structure 102. These distinct cooling hoses are internal cooling hoses 506 that receive cooling liquid from the cooling manifold 214 and that return the cooling liquid to the cooling manifold 214. In at least one embodiment, the cooling manifold is in reference to one or more manifolds capable to maintaining distinct flow paths for received cooling fluid to remove heat from one or more underlying devices 204 and for spent or heated cooling fluid that has removed heat from the one or more underlying devices 204.

In at least one embodiment, the underlying devices 204, along with their cooling or cold plates 502, may be lifted up form the computing module 202. The cooling or cold plates 502 may be in series to allow multiple cold plates to serially pass cooling liquid there through and to serially return the cooling liquid to the cooling manifold 214. Therefore, the access 504 allows removal and servicing or maintenance of the underlying devices 204 and of the cooling or cold plates 502 without requiring disconnection of the internal cooling hoses 506. However, to the extent required, such disconnection is possible with the space now available in the computing module 202.

Figure 6:
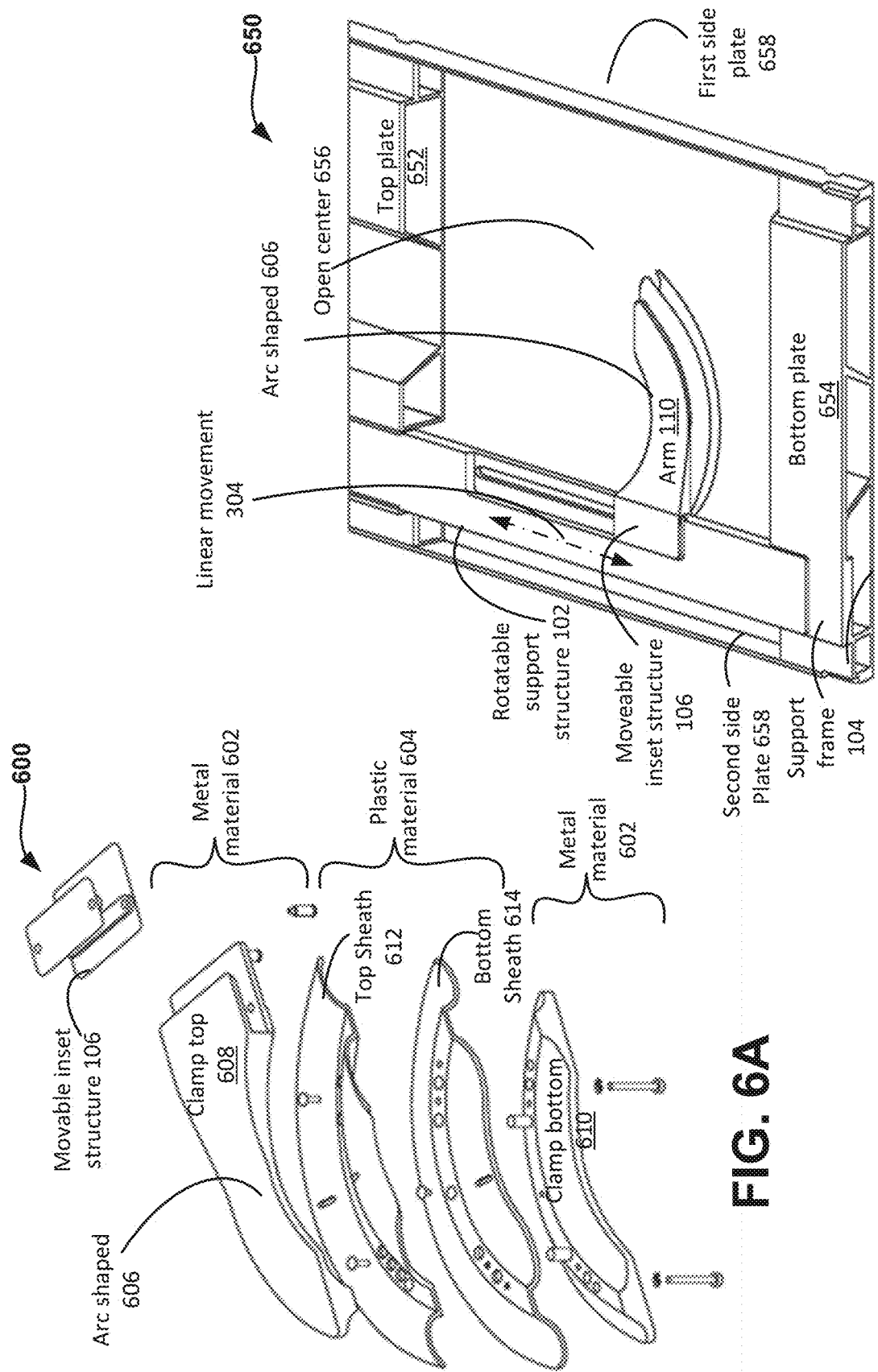
FIG. 6A illustrates features of an arm of a system associated with hose management in a computing module, according to at least one embodiment.
FIG. 6B illustrates features of an arm within a rotatable support structure of a system associated with hose management in a computing module, according to at least one embodiment.

FIG. 6A illustrates features 600 of an arm 110 and a moveable inset structure 106 of a system associated with hose management in a computing module, according to at least one embodiment. The moveable inset structure 106 may include the arm 110 integrated therewith or may include the arm 110 as removable associated components therewith, as illustrated. The arm itself may be composed of at least a metal material 602 and of a plastic material 604. Further, select components are composed of the metal material 602, as illustrated, including a clamp top 608, a clamp bottom 610, and one or more of the clamp screws. Further, the moveable inset structure 106 is able to receive the arm 110 as a removable attachment in provided grooves or areas of the moveable inset structure 106, which may be a clamp slider. In at least one embodiment, there may be a top and a bottom clamp sliders that are associated together with the arm 110 to provide the moveable inset structure 106. Select other components herein are composed of the plastic material 604, including a top and a bottom sheath 612, 614 that directly contact the cooling hoses 112. The top and bottom sheaths 612, 614 are such that the cooling hoses 112 have room or an allowance to move even if the clamp top and clamp bottom are firmly associated together.

In at least one embodiment, at least the metal materials are forged and machined, including by computer-aided machining to provide the shapes and structures described throughout herein. In at least one embodiment, at least the plastic materials are molded and shaped, including by computer-aided designing to provide the shapes and structures described throughout herein. In at least one embodiment, drilling may be used to provide apertures for the fasteners to associate together the metal materials and the plastic materials to provide one or more of the structures in FIGS. 1-6B.

FIG. 6B illustrates features 650 of an arm 110 within a rotatable support structure 102 of a system associated with hose management in a computing module 202, according to at least one embodiment. The features 650 also illustrate the arc shape 606 of the arm 110 to provide natural support to the cooling hoses 112. Further, the features 650 illustrate that the arm 110 may be integrated or removably associated with the moveable inset structure 106 and can extend from the moveable inset structure 106. The arm 110 includes a hose support, such as by one or more of the top and bottom clamps 608, 610 or the top and bottom sheaths 612, 614, to allow movement there through of the cooling hoses 112 during the rotation movement of the cooling hoses 112.

In at least one embodiment, FIG. 6B also illustrates that the support frame 104 may include a top plate 652 and a bottom plate 654 that is opposite to the top plate 652. The moveable inset structure 106 may be removably or integrally associated with the top plate and the bottom plate to form a bridge with an open center 656 of the support frame remaining open as illustrated. Further, there may be first and second side plates 658 that provide structure to the support frame 104 and to enable one or more association aspects of the support frame 104 to the computing module 202.

Figure 7:
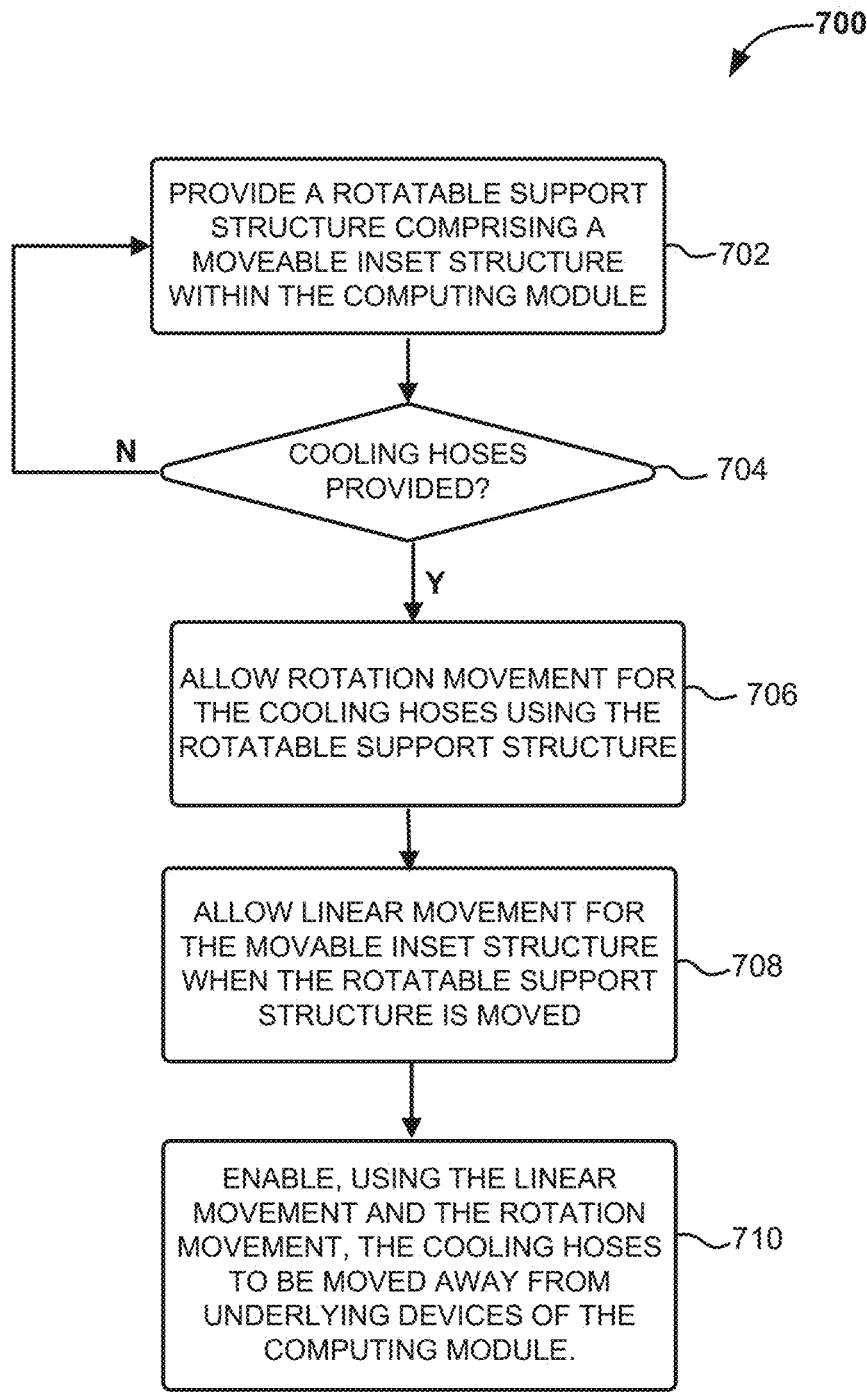
FIG. 7 illustrates a process flow for a system associated with hose management in a computing module, according to at least one embodiment.

FIG. 7 illustrates a process flow or method 700 for a system associated with hose management in a computing module of FIGS. 1-6B, according to at least one embodiment. The method 700 may be associated with a manufacturing or assembly of one or more aspects of the system associated with hose management. The method 700 includes providing 702 a rotatable support structure that includes a moveable inset structure within the computing module. The rotatable support structure is associated with cooling hoses coupled to a manifold of the computing module. For example, the step 702 may be performed by machining the rotatable support structure separately from the movable inset structure and then associating the two at the support rails of the rotatable support structure. Step 702 may include molding for at least the plastic materials of the components associated therewith. There may be a support frame of multiple plates to support the association of the rotatable support structure and the movable inset structure. Further, the movable inset structure may include multiple machined components as part of an integrated or removable arm, including a clamp top and bottom, and may include multiple molded components, including a top sheath and a bottom sheath. The movable inset structure itself may be provided by one or more clamp sliders to slide within a support rail of the rotatable support structure.

A verification 704 may be performed that cooling hoses are provided for the rotatable support structure, such as within the arm of the rotatable support structure. The method 700 includes allowing 706 rotation movement for the cooling hoses using the rotatable support structure. The rotation movement is about an axis of the computing module. For example, allowances and associations between the cooling hoses, the rotatable support structure, and one or more of the support frame or the computing module may be performed in this step of the method 700 to ensure that rotation movement is possible. The method 700 includes allowing 708 linear movement for the movable inset structure when the rotatable support structure is moved in the rotation movement. For example, in this step, at least the movable inset structure is ensured to be properly and freely movable in a support rail of the support frame or the computing module. For example, allowances and associations between the movable inset structure and one or more of the support frame or the computing module may be performed in this step of the method 700 to ensure that linear movement is possible.

The method 700 includes enabling 710, using the linear movement and the rotation movement, the cooling hoses to be moved away from underlying devices of the computing module. The linear movement may be caused in part by tension on the cooling hoses from being coupled to the manifold of the computing module. The enabling 710 step may be performed by allowing the rotatable support structure to be rested in a closed position after manufacturing or assembly. Further, the enabling 710 step may be performed by ensuring that the cooling hoses, at the proximal ends, are associated with the cooling manifold for operation of a liquid cooling system. The enabling 710 step is also so that the rotatable support structure may be lifted for servicing, maintenance, or other aspects to access an underlying device of the computing module.

In at least one embodiment, the method 700 may include a further step or a sub-step for enabling a rotatable coupler or a rotational aspect of the manifold to rotate about an axis of the computing module to support the rotation movement of the cooling hoses. In at least one embodiment, the method 700 may include a further step or a sub-step for providing a mounting bracket to support distal ends of the cooling hoses against the computing module. Further, proximal ends of the cooling hoses are coupled to the manifold prior to operation.

In at least one embodiment, the method 700 may include a further step or a sub-step for the mounting bracket to be removably associated with the computing module and to be removed to enable the rotatable support structure to be rotated about the axis of the computing module. In at least one embodiment, the method 700 may include a further step or a sub-step for integrating or removably associating an arm with the moveable inset structure. The arm extends from the moveable inset structure and includes a hose support, such as sheaths and/or clamps. In at least one embodiment, the method 700 may include a further step or a sub-step for allowing movement, through the arm, of the cooling hoses during the rotation movement of the cooling hoses.

In at least one embodiment, the method 700 may include a further step or a sub-step for the arm to include a metal material and for the hose support to include a plastic material. In at least one embodiment, the method 700 may include a further step or a sub-step for the arm to be shaped in an arc to support a loop position of the cooling hoses. The loop position may be formed from the cooling hoses extending in a first direction into the computing module and extending counter to the first direction, to the manifold.

Figure 8:
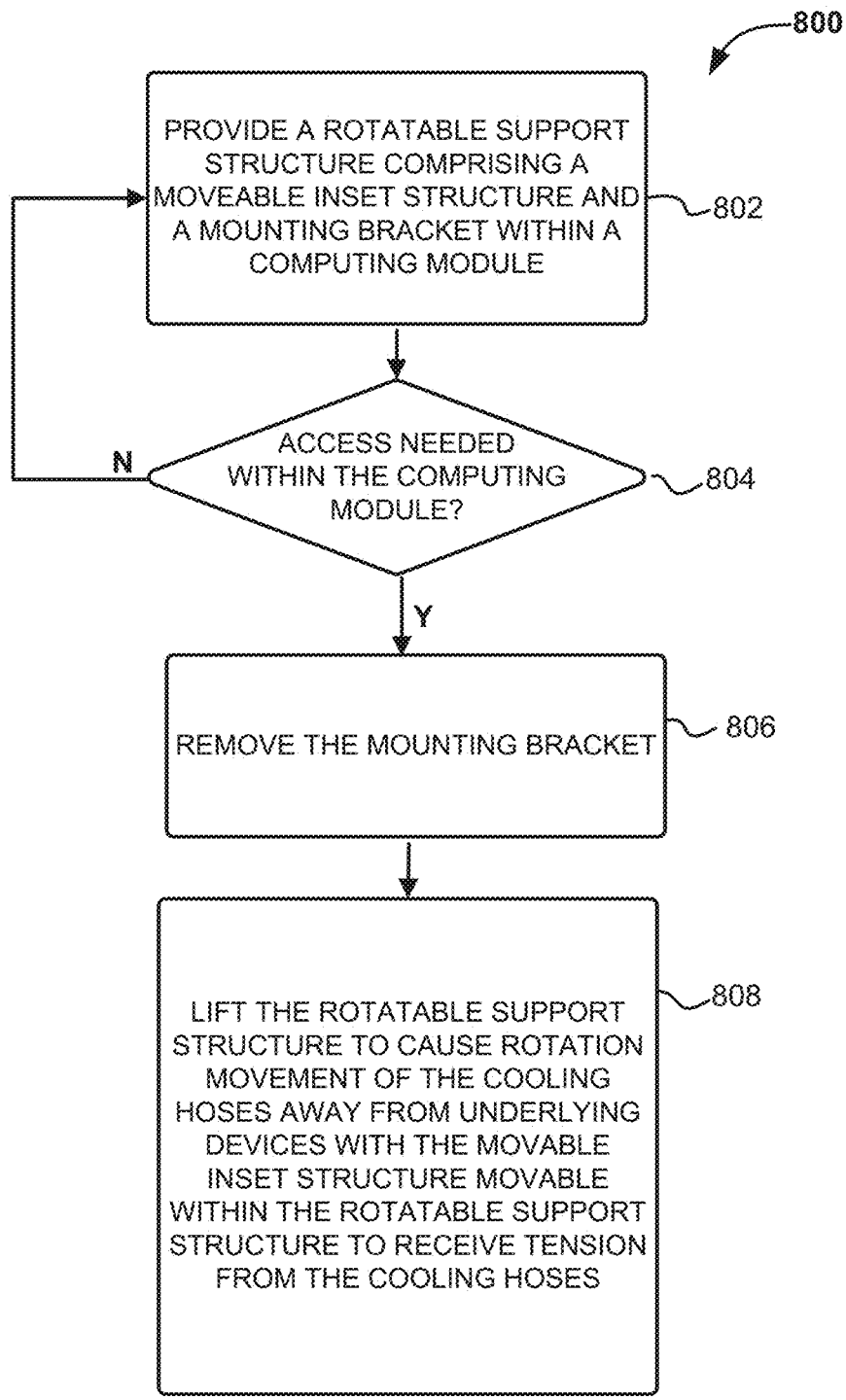
FIG. 8 illustrates a further process flow for a system associated with hose management in a computing module, according to at least one embodiment.

FIG. 8 illustrates a further process flow or method 800 for a system associated with hose management in a computing module, according to at least one embodiment. For example, the method 800 may be a method of use of the system associated with hose management in a computing module. The method 800 may include providing 802 a rotatable support structure that further includes a moveable inset structure and that is associated with a mounting bracket supporting distal ends of cooling hoses against a computing module that is capable of liquid cooling. The method 800 includes a step 804 for determining that access is needed to within the computing module, such as to the underlying devices in the computing module. The method includes removing 806 the mounting bracket that is associated with the distal ends of the cooling hoses so that the cooling hoses are spatially free to move.

In at least one embodiment, the method 800 includes lifting 808 the rotatable support structure to cause rotation movement of the cooling hoses. Further, in the lifting 808 step, the rotation movement is about an axis of the computing module to allow the cooling hoses to be moved away from underlying devices of the computing module. In addition, in the lifting 808 step, the movable inset structure is movable within the rotatable support structure to receive tension on the cooling hoses from being coupled to a manifold of the computing module. Here, the proximal ends of the cooling hoses are coupled to a manifold of the computing module that causes, in part, the tension on the cooling hoses with the rotation movement occurring.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system for hose management in a computing module, comprising:
    a rotatable support structure comprising a moveable inset structure, the rotatable support structure to support rotation movement of cooling hoses that are to cool underlying devices in the computing module, wherein the rotation movement is about an axis of the computing module to allow the cooling hoses to be moved away from the underlying devices of the computing module and wherein the movable inset structure is movable within the rotatable support structure to receive tension on the cooling hoses from being coupled to a manifold of the computing module.

2. The system of claim 1, further comprising:
    a rotatable coupler or a rotational aspect of the manifold to be associated with the cooling hoses, the rotatable coupler or the rotational aspect of the manifold to also rotate about the axis of the computing module to support the rotation movement of the cooling hoses.

3. The system of claim 1, further comprising:
    a mounting bracket to support distal ends of the cooling hoses against the computing module, wherein proximal ends of the cooling hoses are coupled to the manifold.

4. The system of claim 3, wherein the mounting bracket is removably associated with the computing module and is to be removed to enable the rotatable support structure to be rotated about the axis of the computing module.

5. The system of claim 1, further comprising:
an arm that is integrated or removably associated with the moveable inset structure, the arm extending from the moveable inset structure and comprising a hose support to allow movement there through of the cooling hoses during the rotation movement of the cooling hoses.

6. The system of claim 5, wherein the arm is comprised of a metal material and the hose support is comprised of a plastic material.

7. The system of claim 5, wherein the arm is shaped in an arc to support a loop position of the cooling hoses, the loop position formed from the cooling hoses extending in a first direction into the computing module and extending counter to the first direction, to the manifold.

8. The system of claim 1, wherein the moveable inset structure is movable in a linear movement with respect to the rotatable support structure.

9. A rotatable support structure to support rotation movement of cooling hoses that are to cool underlying devices in a computing module, the rotatable supporting structure comprising a moveable inset structure, wherein the rotation movement is about an axis of the computing module to allow the cooling hoses to be moved away from the underlying devices of the computing module, and wherein the movable inset structure is movable with respect to the rotatable support structure to receive tension on the cooling hoses from being coupled to a manifold of the computing module.

10. The rotatable support structure of claim 9, further comprising:
an arm that is integrated or removably associated with the moveable inset structure, the arm extending from the moveable inset structure and comprising a hose support to allow movement there through of the cooling hoses during the rotation movement of the cooling hoses.

11. The rotatable support structure of claim 10, wherein the arm is comprised of a metal material and the hose support is comprised of a plastic material.

12. The rotatable support structure of claim 10, wherein the arm is shaped in an arc to support a loop position of the cooling hoses, the loop position formed from the cooling hoses extending in a first direction into the computing module and extending counter to the first direction, to the manifold.

13. A method for hose management in a computing module, comprising:
providing a rotatable support structure comprising a moveable inset structure to be within the computing module, the rotatable support structure associated with cooling hoses to be coupled to a manifold of the computing module;
allowing rotation movement for the cooling hoses using the rotatable support structure, wherein the rotation movement is about an axis of the computing module;
allowing linear movement for the movable inset structure when the rotatable support structure is moved in the rotation movement;
enabling, using the linear movement and the rotation movement, the cooling hoses to be moved away from underlying devices of the computing module, wherein the linear movement is caused in part by tension on the cooling hoses from being coupled to the manifold of the computing module.

14. The method of claim 13, further comprising:
enabling a rotatable coupler or a rotational aspect of the manifold to rotate about an axis of the computing module to support the rotation movement of the cooling hoses.

15. The method of claim 13, further comprising:
providing a mounting bracket to support distal ends of the cooling hoses against the computing module, wherein proximal ends of the cooling hoses are coupled to the manifold.

16. The method of claim 15, wherein the mounting bracket is removably associated with the computing module and is to be removed to enable the rotatable support structure to be rotated about the axis of the computing module.

17. The method of claim 13, further comprising:
integrating or removably associating an arm with the moveable inset structure, the arm extending from the moveable inset structure and comprising a hose support; and
allowing movement, through the arm, of the cooling hoses during the rotation movement of the cooling hoses.

18. The method of claim 17, wherein the arm is comprised of a metal material and the hose support is comprised of a plastic material.

19. The method of claim 17, wherein the arm is shaped in an arc to support a loop position of the cooling hoses, the loop position formed from the cooling hoses extending in a first direction into the computing module and extending counter to the first direction, to the manifold.

20. A method for hose management in a computing module comprising a rotatable support structure having a moveable inset structure and associated with a mounting bracket supporting distal ends of cooling hoses against the computing module, the method comprising:
removing the mounting bracket; and
lifting the rotatable support structure to cause rotation movement of the cooling hoses, wherein the rotation movement is about an axis of the computing module to allow the cooling hoses to be moved away from underlying devices of the computing module and wherein the movable inset structure is movable within the rotatable support structure to receive tension on the cooling hoses from being coupled to a manifold of the computing module, wherein proximal ends of the cooling hoses are coupled to a manifold of the computing module.

* * * * *